2,887,461

THIXOTROPIC RESIN COMPOSITION COMPRISING AN UNSATURATED ALKYD RESIN, STYRENE AND SILICA AEROGEL

Eugene V. Hort, Westfield, N.J., assignor to Celanese Corporation of America, New York, N.Y., a corporation of Delaware No Drawing. Application October 7, 1953
Serial No. 384,791

7 Claims. (Cl. 260—40)

This invention relates to thixotropic resin compositions and relates more particularly to thixotropic polyester resin compositions.

Resins formed by the polymerization of styrene and an unsaturated alkyd or polyester resin are widely used in the production of coatings, castings, laminates and the like. In using these resins, the unsaturated polyester resin is mixed with the styrene monomer and the mixture so formed is applied as desired, following which polymerization of the unsaturated polyester resin with the styrene is caused to take place. One of the problems encountered in applying the mixture of unsaturated polyester resin and styrene monomer is the tendency of said mixture to flow or drain away from the surface to which it is applied when said surface is not disposed in the horizontal plane, as is frequently the case. Attempts have been made to prevent the flowing or draining away of the mixture simply by increasing the viscosity of the same. However, increasing the viscosity of the mixture has not solved the problem for the reason that the application of the mixture then becomes extremely difficult.

It is an important object of this invention to provide a resin composition which will be free from the foregoing and other difficulties and which will be especially efficient in use.

A further object of this invention is to provide a thixotropic polyester resin composition.

Other objects of this invention will be apparent from the following detailed description and claims.

According to the present invention it has been found that a resin prepared by mixing an unsaturated polyester resin with styrene may be rendered thixotropic by incorporating therein a small proportion, ranging from about 1.5 to 16.5% by weight on the weight of the polyester resin and styrene, of silica aerogel. The composition so obtained tends to set to a gel which shows no tendency to flow or drain away from any surfaces to which it is applied. However, the said composition may be thinned readily by a minimum of mechanical working so that it can be applied without difficulty. In addition, the flow characteristics of the resin composition are substantially independent of the ambient temperatures normally encountered, which is a considerable advantage in applying the said compositions.

The unsaturated polyester resins that may be employed in formulating the thixotropic compositions of this invention may be prepared by reacting a polyhydric alcohol or mixture of such alcohols with an alpha unsaturated alpha beta polycarboxylic acid or mixture of such acids. A portion ranging up to about 50 mole percent of the unsaturated polycarboxylic acid may be replaced by an acid free of alpha beta unsaturation. Instead of using the polycarboxylic acids per se, the anhydrides of such acids may be employed, and the term polycarboxylic acids is intended to include such anhydrides. Suitable polyhydric alcohols that may be employed in preparing the polyester resins include, for example, propylene glycol, ethylene glycol, diethylene glycol, 1,2-butylene glycol and trimethylene glycol. Examples of unsaturated polycarboxylic acids that may be employed in preparing the polyester resins are maleic acid, fumaric acid, bromomaleic acid and itaconic acid. Other polycarboxylic acids that may be employed to replace up to about 50 mole percent of the unsaturated polycarboxylic acids include, for example, phthalic acid, adipic acid, sebacic acid and isophthalic acid. A particularly valuable class of unsaturated polyester resins are those which are hard, brittle solids that may be readily ground or crushed and may be stored for long periods of time without decomposition or change in properties. Such solid resins may be obtained by reacting one or more unsaturated polycarboxylic acids and one or more saturated polycarboxylic acid with one or more polyhydric alcohols until the desired degree of hardness is obtained.

The unsaturated polyester resins are mixed with between about 20 and 75% by weight based on the weight of the unsaturated resin of styrene. When the unsaturated polyester resin comprises a solid, the styrene acts as a solvent to form a solution of said resin. There may also be incorporated into said mixture small amounts, ranging from about ½ to 2% based on the weight of the polyester resin and styrene, of a polymerization catalyst. Many types of polymerization catalyst may be incorporated in the resin of this invention, including, for example, benzoyl peroxide, cyclohexanone peroxide, methyl ethyl ketone peroxide and cumene hydroperoxide. Especially valuable results are obtained when the polymerization system comprises, in addition to the catalyst, an accelerator since the use of this accelerator eliminates the need for heating the resin composition to cause the polymerization of the styrene and the unsaturated polyester resin. Other fillers and additives may also be incorporated into the resin composition with little effect on the thixotropic characteristics of said composition.

The following example is given to illustrate this invention further.

*Example*

An unsaturated polyester resin is prepared by reacting 50 mole percent of phthalic anhydride and 50 mole percent of maleic anhydride with a 25 percent molar excess of propylene glycol until the resin has an acid number of about 50. The excess propylene glycol is distilled off, leaving a solid, hard, brittle unsaturated polyester resin which may be readily crushed and is stable in storage.

A resin composition is prepared by mixing together 10 parts by weight of silica aerogel, 5 parts by weight of hydrated alumina, 60 parts by weight of the unsaturated polyester resin, 40 parts by weight of styrene, 1 part by weight of benzoyl peroxide and 1 part by weight of a 10% by weight solution of dimethylaniline in styrene. After thorough mixing there is obtained a thixotropic gel with the consistency of a light grease. This thixotropic gel may be applied easily to surfaces of any shape and remains on said surfaces without showing any tendency to flow or drain away therefrom. The thixotropic resin cures at room temperature in about 2 hours to a hard, infusible state.

It is to be understood that the foregoing detailed description is given merely by way of illustration and that many variations may be made therein without departing from the spirit of my invention.

Having described my invention, what I desire to secure by Letters Patent is:

1. A thixotropic resin composition comprising an unsaturated solid polyester resin of a polyhydroxy alcohol and an unsaturated polycarboxylic acid, a solvent for said polyester resin consisting essentially of styrene and an ingredient for making the composition thixotropic consisting essentially of a small proportion of silica aerogel, 2. A thixotropic resin composition comprising an unsaturated solid polyester resin of a polyhydroxy alcohol and an unsaturated polycarboxylic acid, a solvent for said polyester resin consisting essentially of styrene and an ingredient for making the composition thixotropic consisting essentially of between about 1.5 and 16.5% by weight based on the weight of the polyester resin and styrene of silica aerogel.

3. A thixotropic resin composition comprising an unsaturated solid polyester resin of a polyhydroxy alcohol and an unsaturated polycarboxylic acid, between about 20 and 75% by weight based on the weight of the polyester resin of a solvent for said polyester resin consisting essentially of styrene, and an ingredient for making the composition thixotropic consisting essentially of a small proportion of silica aerogel.

4. A thixotropic resin composition comprising an unsaturated solid polyester resin of a polyhydroxy alcohol and an unsaturated polycarboxylic acid, between about 20 and 75% by weight based on the weight of the polyester resin of a solvent for said polyester resin consisting essentially of styrene, and between about 1.5 and 16.5% by weight on the weight of the polyester resin and styrene of an ingredient for making the composition thixotropic consisting essentially of silica aerogel.

5. A thixotropic resin composition comprising an unsaturated solid polyester resin formed by the reaction of propylene glycol, maleic anhydride and phthalic anhydride, a solvent for said polyester resin consisting essentially of styrene and an ingredient for making the composition thixotropic consisting essentially of a small proportion of silica aerogel.

6. A thixotropic resin composition comprising an unsaturated solid polyester resin formed by the reaction of propylene glycol, maleic anhydride and phthalic anhydride, a solvent for said polyester resin consisting essentially of styrene, dimethylaniline as a polymerization catalyst, and an ingredient for making the composition thixotropic consisting essentially of a small proportion of silica aerogel.

7. A thixotropic resin composition consisting essentially of 60 parts by weight of an unsaturated solid polyester resin formed by the reaction of a 25 percent molar excess of propylene glycol with a mixture of equal mole percentages of maleic anhydride and phthalic anhydride, followed by distilling off the excess propylene glycol, 40 parts by weight of styrene, 1 part by weight of benzoyl peroxide, 1 part by weight of a 10% by weight solution of dimethylaniline in styrene, 10 parts by weight of silica aerogel and 5 parts by weight of hydrated alumina.

References Cited in the file of this patent

UNITED STATES PATENTS

| | | |
|---|---|---|
| 2,480,928 | Murdis | Sept. 6, 1949 |
| 2,610,959 | Nordlander | Sept. 16, 1952 |
| 2,623,030 | Cordier | Dec. 23, 1952 |
| 2,743,309 | Lindsay | Apr. 24, 1956 |